Patented Dec. 4, 1945

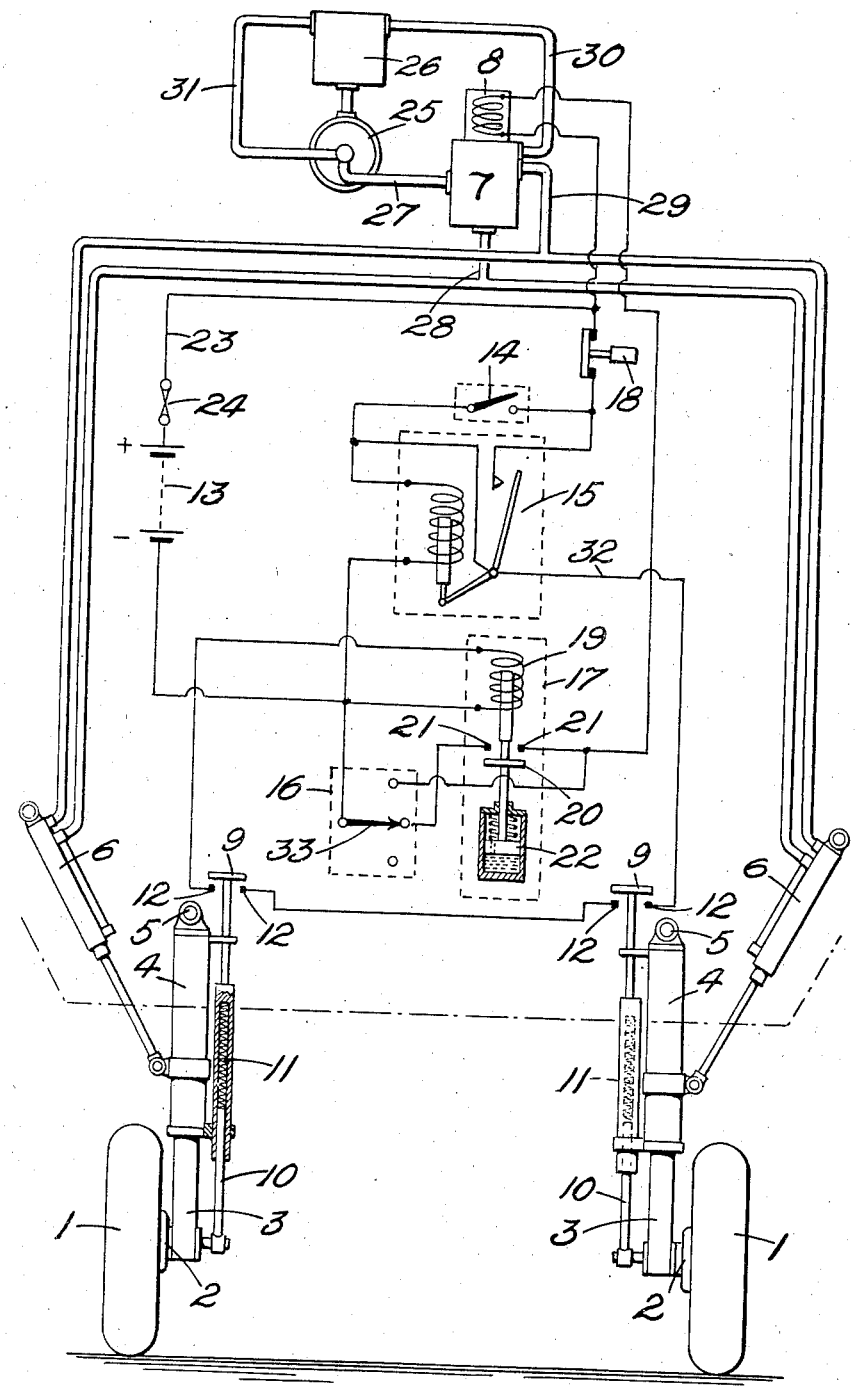

2,390,334

UNITED STATES PATENT OFFICE 2,390,334

AIRCRAFT RETRACTABLE ALIGHTING GEAR

George Norman Snarey, Warwick, England, assignor to Dowty Equipment Limited, Cheltenham, England Application August 17, 1942, Serial No. 455,042
In Great Britain June 20, 1941

20 Claims. (Cl. 244—102)

In aircraft fitted with retractable undercarriages it is for numerous reasons desirable to raise the undercarriage as soon as possible after take-off in order to eliminate aerodynamic drag.

Since the pilot's attention is fully occupied during take-off, it is, according to the present invention, proposed to relieve him of the duty of operating control valves or selectors by making the process of retraction fully automatic.

The present invention, therefore, broadly stated consists in aircraft retractable alighting gear in which control means are rendered operative in an unloaded condition of the alighting gear to effect retraction thereof.

The system includes delay-action means operating to prevent retraction occurring upon a momentary relief of load such as might result in taxiing over a rough field by bouncing of the airplane.

For retraction and extension operation, fluid pressure from some available source is delivered to jack means operable for effecting retraction and extension according to the setting of an electrically-controlled valve, the arrangement being such that when the normal struts or shock-absorber means incorporated in the undercarriage are completely relieved of supporting load, as they are when the aircraft is in flight, switch means are actuated to operate the electrically-controlled valve to effect retraction of the undercarriage.

In order that the invention may be clearly understood and more readily carried into effect, it is hereinafter described with reference to the accompanying diagrammatic drawing, which shows an automatically-controlled landing element mounting retraction scheme embodying a fluid pressure remote control system operable by electrical means.

Referring now to the drawing, landing elements such as the wheels 1, are mounted each on the spindle 2 connected to the telescopically-yielding strut parts 3. Each yielding strut part 3 is slidable under landing and taxiing loads with respect to the non-yielding strut part 4, usually in the form of an oleo-pneumatic shock-absorber cylinder. Each non-yielding strut part 4 is mounted to swing laterally outwards about the retraction pivot 5 under the influence of retraction and extension effort applied through the remotely-controllable hydraulic jacks 6 connected one between each strut part 4 and some convenient fixed anchorage on the aircraft structure.

Operation of the jacks 6 for retraction and extension purposes is effected under control of fluid pressure appropriately directed by means of the valve 7 actuated by the solenoid 8. Conveniently, the solenoid-controlled valve 7 is of the type described in the co-pending application Serial No. 398,674 (Patent No. 2,379,536, granted July 3, 1945), but in any case it is preferred that when the solenoid is not energised it sets the valve into such condition that actuating fluid pressure operates the jacks 6 to extend the mountings, whereas when the solenoid is energised it sets the valve to ensure retraction of the landing element mountings. The valve thus has an inherent safety factor since no electrical power is required to extend the landing element mountings.

As shown in the drawing, it can be assumed that the aircraft is still ground-borne and in consequence the telescopic legs are still loaded in compression, as is evidenced by the fact that the plunger-actuated switch contacts 9 are open. The contacts 9 are held open by the plunger arms 10 which permit the contacts to close when the telescopic mountings extend on complete relief of load in compression, as occurs when the aircraft is air-borne. The switch-actuated plunger arms 10 each includes a yieldable spring device 11 the function of which is to accommodate a permissible degree of over-travel and to absorb any excessively violent shocks, and complete relief of compression load on the mountings results in closure of the contacts 9 against the fixed contacts 12.

Referring to the electrical circuit, the battery is indicated at 13. The reference numeral 14 represents a holding-actuated switch controlling the throttle relay enclosed within the dotted area 15, which actuates a switch in parallel with switch 14. 16 represents a manual control switch, and 17 a delay-action switch mechanism. 18 is a press-button control switch for breaking all circuits to de-energise the solenoid 8 and set the valve for extending the retractable mountings.

The throttle-actuated switch 14 is closed by movement of the throttle to full advance position, which it occupies at take-off, but is opened by the throttle lever on substantial closure of the throttle from full advance position, such as is effected for cruising.

The manual control switch 16 is operable to raise or lower the retractable mountings but when set to the "auto" position, as shown in the drawing, retraction operation is automatic when the aircraft has become properly air-borne, re-extension being performed by operation of the press-button 18.

The delay-action switch mechanism represented at 17 operates to provide a time-lag to ensure that momentary relief of load on the resilient mountings, such as might occur following a severe bump, during taxiing for take-off for example, shall not permit untimely retraction.

When the aircraft is taking off the throttle is opened fully, which closes switch 14 to energize holding solenoid 15 and close its switch. A circuit will thus remain completed from the positive pole of battery 13 to switches 9, even after the throttle is partially closed, as long as switch 18 is not opened. The switches 9 close against the contacts 12 immediately the aircraft becomes airborne, to complete the circuit through solenoid 19 of the delay-action switch mechanism to the negative pole of battery 13. The solenoid thus energized draws the movable contact member 20 towards the fixed contacts 21, to effect damped movement of the movable contact under the fluid resistance and light return resilience imposed by the dash-pot device 22.

The positive of the battery is connected to the solenoid 8 through the line 23, the other end of the coil of the solenoid being connected to one of the switch contacts 21. With the switch 16 in the "auto" position, as shown, closer of the member 20 onto the fixed contacts 21 completes the circuit to the negative of the battery through the manual switch 16. Energization of solenoid 8 effects movement of valve 7 to the retracting setting.

The reference numeral 24 indicates a fuse of which several can be provided in the circuit.

In regard to the hydraulic system controlled by the solenoid-actuated valve 7, it will be realised that any suitable system may be employed, but there is shown diagrammatically a very simple form of system utilising as the source of pressure a continuously-driven pump 25. The pump 25 draws liquid from the reservoir 26, discharging the liquid at pressure along the conduit 27 to the valve 7. Dependent upon the setting of the valve, actuating pressure liquid passes from the valve along either the conduit 28 or the conduit 29, return flow of the system liquid feeding back to the reservoir 26 through the conduit 30. The conduits 28 and 29 are branched, flow to the jacks 6 through the conduit 28 operating the jacks 6 for retraction, whereas flow to the jacks through the conduit 29 effects extension.

The valve 7 may be of any suitable form provided that it is operable by the solenoid and is so ported that in its alternative limit positions it permits passage of liquid from the conduit 27 to the conduits 28 and 29, with return flow from either 28 or 29 back to the reservoir through the conduit 30.

The conduit 31 is connected between a centrifuge outlet of the pump 25 back to the reservoir, and in fact provides an idling circuit for cooling when the pump is not required to deliver actuating liquid into the system.

With the manual control switch 16 in the "auto" position re-extension of the resilient mounting means for the landing elements is effected by opening the circuit to the holding solenoid 15 and time-delay switch relay 19 by means of the press-button 18. With solenoid coil 19 deenergized the spring of dashpot 22 opens switch 20, 21 to deenergize solenoid 8, thus to permit valve 7 to shift to lowering position. It is important to note that if the undercarriage is lowered prior to landing and the pilot decides to make an emergency climb, full opening of the throttle closes the switch 14, which in turn reenergizes the holding relay 15; connection with the positive terminal of the battery 13 being re-established through the released press-button switch 18, while the circuit to the negative terminal of the battery is completed through the lines 32 extending from the throttle relay 15 through the switch contacts 12 closed by the movable contact members 9 and relay coil 19, with the result that retraction is effected by energization of solenoid 8 as soon as the delayed-action switch 21 is closed by such relay.

Setting of the movable element 33 of the manual switch device 16 to the "raise" or "lower" position over-rides the automatic control and effects retraction or extension appropriately without delay. Extension, in such case, occurs by reason of the bias of the valve 7 towards "extension" position upon deenergization of the solenoid 8.

Other mechanism may be substituted for the delay-action relay described, provided it functions so that momentary operation of the shock-absorber actuated switch during take-off will not affect the delay obtained before retraction occurs subsequent to the aircraft becoming properly airborne.

Although for convenience the invention has been described and illustrated with reference to an arrangement in which the resilient mounting for the landing elements are constituted by telescopic struts, the telescopic struts may in practice be replaced by any other convenient form of resilient mounting means, such for instance as a levered type of suspension in which the landing element is carried by a lever pivotally connected to a leg which is itself non-yielding under landing and taxiing loads, the resilient resistance to landing and taxiing loads being provided by a shock-absorber operating between the lever and the leg, as shown in Reissue Patent 22,255, Patent 2,296,017, or Patent 2,236,020, for example.

What I claim is:

1. A control for the retracting mechanism of retractable aircraft alighting gear which includes a ground engaging means moved relative to the aircraft by relieving it of weight imposed by the aircraft, comprising an actuator operable to control the retracting mechanism, time delay mechanism operatively connected to said actuator, and operable at the end of a predetermined time following its energization to effect operation of said actuator to control the retracting mechanism for moving the alighting gear into retracted position, and means operatively connected between the ground engaging element and said time delay mechanism, and operable to energize said time delay mechanism by movement of the ground engaging means relative to the aircraft when relieved of its load.

2. The control of claim 1, and manual means operatively connected with the actuator, and controllable to operate the actuator for effecting immediate retracting operation of the alighting gear retracting mechanism at will and independently of movement of the ground engaging means relative to the aircraft and unimpeded by the time delay mechanism.

3. The control of claim 1, and manual means operatively connected with the time delay mechanism to deenergize it regardless of the position of the ground engaging means relative to the aircraft for effecting operation of the actuator to control the retracting mechanism for moving the alighting gear into ground engaging position.

4. In an aircraft alighting gear, retracting mechanism for such gear, an element movable relative to the aircraft as the aircraft becomes air-borne, means operable to effect extending operation of said retracting mechanism so long as the alighting gear continues to support the aircraft, and automatically operable by such movement of said element relative to the aircraft to initiate retracting operation of said retracting mechanism, and a delay-action device operable to postpone operation of said means to initiate retracting operation of the retracting mechanism for a predetermined interval of time subsequent to such movement of said element relative to the aircraft.

5. The combination of claim 4, in which the retracting mechanism comprises a fluid actuated jack connected to retract the alighting gear, and the means includes an electrically controlled valve governing supply of fluid under pressure to said jack, and an electric circuit connected to said valve and energizable by movement of the element relative to the aircraft as the aircraft becomes air-borne to actuate the valve for effecting retracting operation of said jack.

6. The combination of claim 4, in which the retracting mechanism includes a fluid actuated jack operatively connected to move the alighting gear, and the means includes an electrically controlled valve governing supply of fluid under pressure to said jack, and an electric circuit connected to said valve and energizable to move said valve for effecting retracting movement of said jack and deenergizable for movement of said valve to effect extending movement of said jack.

7. In a retractable aircraft landing gear, double-acting jack means operatively connected to the landing gear and operable to effect retracting and extending movement thereof, a source of actuating fluid under pressure, an electrically operated valve operatively connected to and between said jack means and said fluid source, and movable between a position in which fluid flows between said source and said jack for effecting retracting movement of the jack and a position in which fluid flows between the source and said jack for effecting extending movement of said jack, an electrical operating circuit connected to said valve, delay-action switch means in said circuit operable after energization to postpone its action on said circuit for a predetermined period of time, landing gear responsive means operable by relieving the landing gear of weight imposed by the aircraft to initiate operation of said delay-action switch means, and a manually controllable switch in said circuit manually operable for rendering said delay-action switch means and said landing gear responsive means inoperative to influence said electric circuit, and further operable to energize or to deenergize said circuit for moving said valve to effect extending or retracting movement of said jack at will.

8. The combination of claim 7, in which the valve is constructed to regulate flow of fluid from the source to the jack for effecting retracting operation thereof upon energization of the electric circuit and for effecting flow of fluid from the source to the jack for effecting extending movement thereof upon deenergization of the electric circuit.

9. The combination of claim 7, in which the landing gear responsive means includes a plunger movable relative to the aircraft by relieving the landing gear of weight imposed by the aircraft, and spring means operable to cushion the plunger and prevent excessive movement thereof relative to the aircraft by movement of the landing gear relative to the aircraft under the influence of landing and taxiing loads.

10. The combination of claim 7, and a further switch openable to prevent energization of the delay-action switch means by operation of the landing gear responsive means when the landing gear is relieved of weight imposed by the aircraft, but movable to closed position for energization of the delay-action switch means by opening of the throttle of the aircraft engine to a predetermined extent, for moving the valve to effect extending movement of the jack means.

11. In aircraft alighting gear, retracting mechanism operable to move such gear between retracted and extended positions, an actuator for said retracting mechanism, means normally controlling said actuator to effect retracting movement of said retracting mechanism when the alighting gear is not supporting weight imposed by the aircraft, and means operable at will to render said first means inoperative to control said actuator for effecting retracting movement of said retracting mechanism, but operable automatically by opening of the throttle of the aircraft engine to a predetermined extent to render said first means operable to control said actuator for operating said retracting mechanism to retract the alighting gear.

12. The combination of claim 11, and delay-action mechanism operable to postpone operation of the actuator for a predetermined period of time after both means are actuated for controlling the actuator to effect retracting movement of the retracting mechanism.

13. In combination with a first means to effect retraction and extension of an aircraft undercarriage, which means is normally biased to effect extension, and for use with an undercarriage wherein two elements are relatively movable in one sense when the aircraft is ground-borne, and in the opposite sense when it is air-borne, a second means operatively connected to said first means to override, when energized, the extending bias thereof and thus to effect retraction, and a third means including a control device adapted to be so operatively connected, relative to the two relatively movable elements of the undercarriage, as to be moved, upon movement of such elements, into operative position when the aircraft is air-borne, and into inoperative position when the aircraft is ground-borne, said third means being operatively connected to said second means to energize the latter when said control device is in operative position, to initiate retraction, and vice versa.

14. The combination of claim 13, including time-delay means operatively interposed in said second means to postpone energization of the latter in the event of only momentary discontinuance of ground support of the aircraft.

15. The combination of claim 13, the third means additionally including an element arranged for movement to operative position by movement of the aircraft throttle to open position, whereby retraction of the undercarriage is automatically initiated by opening the throttle while the aircraft is air-borne.

16. The combination of claim 13, including a fourth means operable at will to by-pass the second and third means, and operatively connected to the first means, to control energization, at will, of said first means, and thereby to effect movement of the undercarriage.

17. In combination with hydraulic means to effect retraction and extension of an aircraft undercarriage, including a solenoid-operated valve biased to remain in "extending" position but shiftable when energized to "retracting" position, and for use with such an undercarriage wherein two parts are relatively movable in one sense when the aircraft is ground-borne, and in the opposite sense when it is air-borne, a first electric circuit including said solenoid and a normally open switch, a second circuit including a solenoid arranged, when energized, to close said switch, and also including switch means adapted to be operatively connected to the two undercarriage parts and arranged to remain open while the aircraft is ground-borne, and to be closed when the aircraft becomes air-borne, whereby when the aircraft becomes air-borne the second circuit is automatically energized, and by closure of the first-circuit switch the solenoid-operated valve is shifted to "retracting" position to effect automatically retraction of the undercarriage.

18. The combination of claim 17, including also time-delay means operatively connected to said normally open first-circuit switch, arranged to delay closure thereof for a predetermined period following closure of said second-circuit switch means.

19. The combination of claim 17, including also a switch in said second circuit operatively arranged to be closed by substantially full closure of the aircraft throttle, and to be open when the throttle is not substantially fully closed, to interdict initiation of retraction, whereby retraction can only be initiated while the aircraft is air-borne and its throttle is substantially fully closed.

20. The combination of claim 17, including also a switch in said second circuit operatively arranged to be closed by substantially full closure of the aircraft throttle, and to be open when the throttle is not substantially fully closed, to interdict initiation of retraction, whereby retraction can only be initiated while the aircraft is air-borne and its throttle is substantially fully closed, and time-delay means operatively connected to said normally open first-circuit switch, arranged to delay closure thereof for a predetermined period, notwithstanding closure of the throttle-connected switch and the undercarriage connected switch means, and consequent energization of the second-circuit solenoid.

GEORGE NORMAN SNAREY.